United States Patent [19]

Ogawa

[11] Patent Number: 5,565,632
[45] Date of Patent: Oct. 15, 1996

[54] PRESSURE SENSITIVE STYLUS PEN

[75] Inventor: Yasuji Ogawa, Otone-machi, Japan

[73] Assignee: Wacom Co., Ltd., Otone-machi, Japan

[21] Appl. No.: 452,345

[22] Filed: May 26, 1995

[30] Foreign Application Priority Data

Feb. 20, 1995 [JP] Japan .................................. 7-055071

[51] Int. Cl.$^6$ ...................................................... G01C 1/00
[52] U.S. Cl. .................................. 73/862.69; 73/862.041
[58] Field of Search ..................... 73/862.041, 862.541, 73/862.69, 865.7; 364/709.11; 178/18

[56] References Cited

U.S. PATENT DOCUMENTS

| | | | |
|---|---|---|---|
| 4,631,356 | 12/1986 | Taguchi et al. | 178/19 |
| 4,704,501 | 11/1987 | Taguchi et al. | 178/19 |
| 4,845,478 | 7/1989 | Taguchi et al. | 340/712 |
| 4,890,096 | 12/1989 | Taguchi et al. | 340/712 |
| 5,134,689 | 7/1992 | Murakami et al. | 395/143 |

FOREIGN PATENT DOCUMENTS

| | | |
|---|---|---|
| 63-257823 | 10/1988 | Japan . |
| 64-53223 | 3/1989 | Japan . |
| 253805 | 11/1990 | Japan . |
| 3147012 | 6/1991 | Japan . |
| 496212 | 3/1992 | Japan . |
| 5275283 | 10/1993 | Japan . |

*Primary Examiner*—Richard Chilcot
*Assistant Examiner*—Ronald Biegel
*Attorney, Agent, or Firm*—Joseph W. Berenato, III

[57] ABSTRACT

A stylus which has a pressure sensitive arrangement for reliably sensing a depressing force although the stylus being slantingly disposed, by using inductance change generated from an interval displacement between a moveable magnetic body and a fixed magnetic body, which has a coil wounded around thereof and is disposed at a predetermined distance from said moveable magnetic body. The arrangement has a pen tip member having a contact portion for receiving the pen pressure; an elastic material member disposed between the moveable and fixed magnetic bodies; a first supporting device disposed to hold the position of the fixed magnetic body against a depressing pressure; and a second supporting device for supporting the depressing member in a condition established when the rear end plane of the moveable magnetic body and the front end plane of the fixed magnetic body are placed with each other in a parellel position by receiving the depressing pressure.

24 Claims, 8 Drawing Sheets

PRESSURE SENSITIVE STYLUS PEN

BACKGROUND OF THE INVENTION

1. Field of the Invention

This invention relates to the stylus used as a positional indicator in a coordinate input device, which is an input device of a computer system, normally called a digitizer or tablet, and more particularly to a stylus that can detect pen touch pressure or which comprises pen pressure sensitive mechanisms.

2. Description of the Prior Art

A stylus pen used as a positional indicator of the digitizer is normally provided not only to detect the coordinates of an indicated position, but also to detect pen-down information where the pen point is in touch condition with the position detecting surface. Generally, the method to detect the position includes detecting a depressing force loaded against a member provided at the top of the pen, which is the component transmitted along the axial direction of the pen.

First, the method for detecting the position of the digitizer will be explained before describing the arrangement of the stylus. There are several positional detecting methods used in the digitizer, so an example using an electromagnetic method for receiving/transmitting the information will now be described. It has combined arrangements of a positional detecting plane on which many sensor coils are positioned parallel to the direction of the positional detection, and a positional indicator such as a pen or cursor. Two arrangements are normally provided in the X and Y directions by orthogonally positioning them relative to each other on the respective detecting plane to detect both in the X and Y directions. A coil or resonant circuit is also provided to make electromagnetic interactive operations between the sensor coils. To point out an example, electromagnetic waves are sent out from the sensor coil, and responsive electromagnetic waves, which are radiated because of an interactive action between the resonant circuit within the positional indicator and the electromagnetic waves, are received at the sensor side. Operations, including interpolations, are performed, based upon the signal received from the coil that has the most powerful signal strength and its neighboring coil, to decide the position thereof.

A feature of this electromagnetic receiving/transmitting method is that it can be fabricated, and the positional indicator is a cordless device and there is no need for a power source within the indicator. Detailed description of it can be found in Japanese Patent Application laid open H2-53805 and H3-147012.

There is also another method for detecting position in which electromagnetic waves are sent from a positional detecting plane and are received at a corresponding positional detector, and a further simplified electromagnetic method in which electromagnetic waves are sent from a positional indicator reverse to those of a former wave, and are received at the positional detecting plane side.

The positional indicator, as mentioned above, using the electromagnetic interaction to detect the respective position, is provided with coil or resonant circuits within itself. Furthermore in that positional indicator of the stylus type, it has been realized these operations change the resonant conditions of the above-mentioned coils or resonant circuits from that of the stable conditions.

Several arrangements have been proposed for a stylus which has a stylus pressure sensitive mechanism. For example, an arrangement was provided in which part of the inductance or capacitance of the resonant circuit or coil was replaced with a variable coil or capacitance, or to which a variable resistance was added so that these variable components were allowed to produce a certain change when the stylus pressure was applied thereto. Reference should be made to the Japanese patent application Publication Laid-open Nos. S63-257823, S64-532222, H1-5322, H4-96212, and H5-275283.

Figures 1A, 1B:
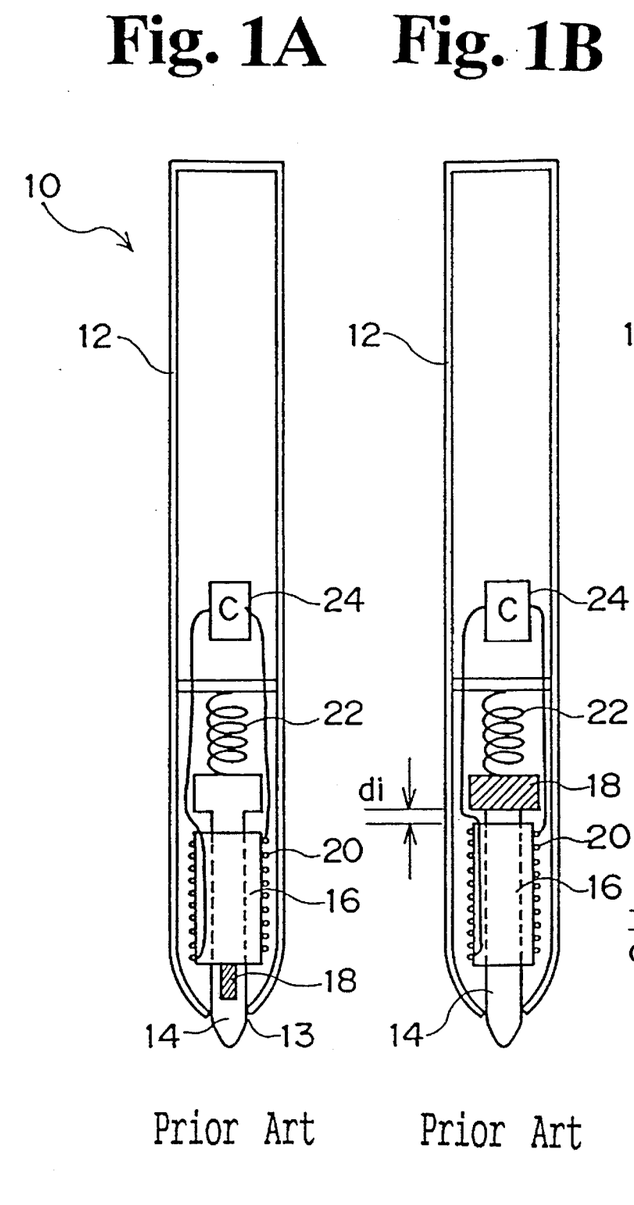
FIG. 1A, FIG. 1B and FIG. 1C illustrate three versions of a prior art stylus that can detect pen pressure.
Figure 1C:
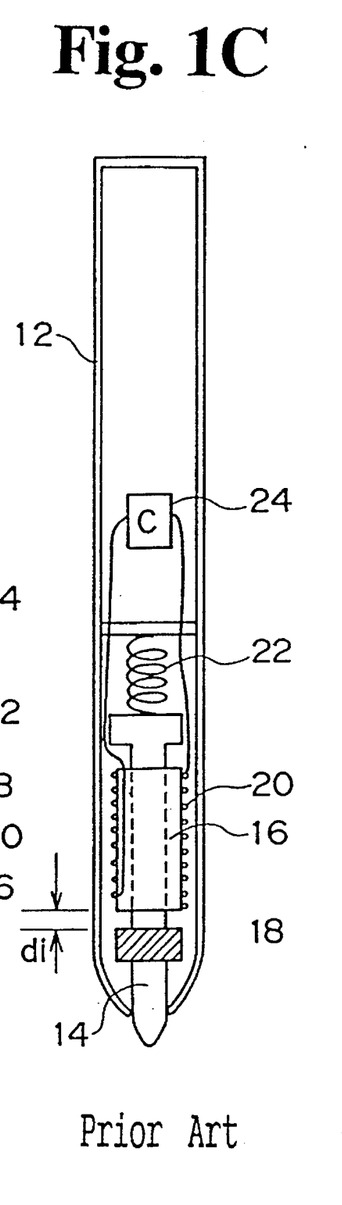

Some prior art examples of the pressure sensitive styli are shown in FIG. 1A, FIG. 1B, and FIG. 1C, in each of which a resonant circuit is disclosed.

As for commonly provided structural components in the styli shown in FIGS. 1A to 1C, they comprise a casing 12 having a cylindrical outer body, a core body 14 provided on the axis of the casing, a ferrite core 16 having a through-hole for slidable housing body 14, coil 20 wound around the core 16, a movable magnetic body that can move in relation to the core, an elastic body or spring 22, and a condenser(capacitor) 24. The core body 14 has a generally cylindrical form, while its upper neighboring portion which touches the positional detecting plane has a tapered form such that the operation allows it to easily indicate a specified point. Other components such as optionally provided switches are not shown.

The principle of pressure detecting operation during the pen-down mode will now be described. The ferrite core 16 is fixed to pen casing 12. The body 14 moves backward along is axis by is depressing force when the pen top 32 is depressed against the positional detecting plane. The moveable magnetic body 18 is positioned to move in conjugation with the core body in the examples. The relative distance to the core 16 is therefore varied as the magnetic body 18 moves. In FIGS. 1B and 1C, the symbol di indicates the initial gap (in case any depressing force exists) between the core 16 and the magnetic body 18, while the coil 20 and the capacitor 24 form a resonant circuit. Conditions of this resonant circuit are determined such that the circuit resonates with the sensor coil while receiving and transmitting the electromagnetic waveforms between them. The inductance of the coil 20 can be changed when the gap between the core 16 and the magnetic body 18 is changed. It thus detects the depressing force against the pen top by sensing the change in the resonant conditions caused by where the pen is placed.

In FIG. 1A, the magnetic body 18 is fixed onto the side wall of the core 14 so that it moves with the core 14. In FIG. 1B, the body 18 is fixed to the rear end portion of the core 14, so that it moves in accordance with the axial movement of the core 14. In FIG. 1C, the magnetic body 18 is placed in front of the core 16, so that it is fixed in a manner to surround the core 14.

A feature common to each of the styli 10 of the prior art shown in FIGS. 1A to 1C is that the core body 14 has a structure in which it moves only in its axial direction. That is, in any of the examples, the core 14 moves only in a sliding manner through the hole of the core 16 of the fixed magnetic body. Sufficient gain is attained with this arrangement if the stylus 10 is operated in vertically standing condition relative to the positional detecting plane, since the depressing force effects toward its central axis.

However, if the stylus 10 is operated in an inclined position against the detecting plane, the direction of the depressing force is then no more coincident with the axial direction of the body 14. In such a case, only the axial component of the depressing force is transferred to the body 14 so that the amount of the depressing force contributing to detection is decreased. Thus, the inductance change generated by the displacement of the magnetic body is reduced. The sensitivity of the pen pressure detection is also reduced if the stylus is operated in an inclined position so that it cannot detect a weaker pen pressure. If it is necessary to achieve the same level of sensitivity as that of the pen when orthogonally disposed relative to the plane, although the pen is placed in inclined position, an increased depressing force would have to be exerted for the pen to get the same displacement of the core body, i.e., magnetic body as that of the aforementioned orthogonal position to the plane.

Normally, it is natural for an operator to hold the pen in an inclined position, rather than in an orthogonal position while inputting with the pen in hand onto a horizontal plane.

To attain an increased absolute sensitivity by compensating for such a defect, it is desirable to provide structure that provides the moveable magnetic body 18 with a larger area, and has its end face opposed to the face of the fixed magnetic body 16 such as shown in FIG. 1B rather than to use the body 18 having a smaller area shown in FIG. 1A. In FIGS. 1B and 1C, it is however required to assemble the pen with the initial gap predetermined as the interval between the two magnetic bodies when the pen is not depressed by its tip. That requires high accuracy when placing the moveable body.

Ferrite material normally used for the fixed magnetic body is made through sintering, so that its dimensional tolerance is low and thus it is difficult to ensure the accuracy mentioned above.

A second problem in operating the stylus with an inclining position is the friction encountered when the core body slides through the hole cut into the ferrite core, so that the pen pressure sensitivity is decreased. Also in this regard, it is necessary to depress the pen with a much increased force if the pen is used in an inclined position.

Thus, in all regards, the operability of the stylus in an inclined position is low. Therefore, an input operation with a light operational feeling is not realized. This makes the operability lower, not only with the positional detecting device, but also with the entire computer system.

SUMMARY OF THE INVENTION

It is an object of the present invention to provide a stylus that can ensure detection of the pen pressure even when the pen is operated in an inclined position.

It is another object of the present invention to provide a stylus that can ensure detection of the pen pressure and to provide a light operational feeling even when the pen is operated in an inclined position.

For the purpose of accomplishing the aforementioned objects, the present invention provides a pressure sensitive arrangement of the following description, and another pressure sensitive arrangement in a stylus.

In the first aspect of the present invention, a pressure sensitive arrangement for sensing the depressing force by using an inductance change, generated by an interval displacement between a first magnetic body and a second magnetic body, having a coil wound thereabout, comprises:

a depressing member having a contact portion for receiving the pen pressure and a rear end portion located on a substantially opposite side of the contact portion, at least the rear end portion forming a first magnetic body, a second magnetic body having a coil wound around it which is disposed so that its front end plane is located at a predetermined distance from a rear end plane of the rear end portion forming the first magnetic body, an elastic material member disposed between the rear end portion formed by the first magnetic body and the front end plane of the second magnetic body, first supporting means disposed so as to hold the position of the second magnetic body against the pen pressure which is transferred from the depressing member and the elastic member, and second supporting means for supporting the depressing member which is established when the rear portion, forming the first magnetic body, and the front end plane of the second magnetic body are placed with each other not in a parallel position by receiving the pen pressure and others.

The pressure sensitive arrangement may further comprise a support adjustment structure for adjusting the position of the second supporting means, the second supporting means being allowed to move forward and backward with the depressing member being held in contact state, so that the rear end plane of the rear end portion forming the first magnetic body and the front end plane of the second magnetic body are held parallel to each other, and may determine the initial gap between these two end planes when the pen experiences no depressing force.

The depressing member may be comprised of a tapered member providing a contact portion, and a flat plate formed by a first magnetic body in the pressure sensitive arrangement.

In a second aspect of the present invention, a pressure sensitive arrangement for sensing the depressing force by using change in the inductance generated by an interval displacement between a first magnetic body and a second magnetic body, having a coil wound thereabout, in a stylus that comprises a cylindrical pen casing and an electrical resonant circuit is provided. The stylus comprises:

a depressing member having a contact portion for receiving the pen pressure and a rear end portion located on a substantially opposite side of the contact portion, the rear end portion forming a first magnetic body, a second magnetic body having a coil wound thereabout which is disposed with its front end plane being located at a predetermined distance from a rear end plane of the rear end portion forming the first magnetic body, an elastic material member disposed between the rear end portion formed by the first magnetic body and the front end plane of the second magnetic body, first supporting means disposed so as to hold the position of the second magnetic body against the pen pressure which is transferred from the depressing member and the elastic member, and second supporting means for supporting the depressing member in a condition established when the rear end portion forming the first magnetic body and the end plane of the second magnetic body are placed with each other not in a parallel position by receiving the pen pressure.

The pressure sensitive arrangement in a stylus may further comprise a support adjustment arrangement for adjusting the position of the second supporting means, the second supporting means being allowed to move forward and backward with the depressing member being held in a contact state, so that the rear end plane of the rear end portion forming the first magnetic body and the front end of the second magnetic body are held parallel to each other, and determines the initial gap between these two end planes when the pen is free from its depressing force.

The depressing member may be comprised of a tapered member having a contacting member and a plate formed by the first magnetic body for the pressure sensitive arrangement of the stylus.

In a third aspect of the present invention, a stylus comprises a cylindrical pen casing and an electrical resonant circuit, and a pressure sensitive structure for sensing the depressing force by using a change in the inductance generated by an interval displacement between a first magnetic body and a second magnetic body having a coil wound thereabout is provided. The stylus comprises:

- a depressing member having a contact portion for receiving the pen pressure and a rear end portion located substantially opposite the contact member, the rear end portion forming a first magnetic body,
- a second magnetic body having a coil would around which is disposed so that its front end plane is located at a predetermined distance from a rear end plane of the rear end portion forming the first magnetic body,
- an elastic material member disposed between the rear end portion forming the first magnetic body and the front end plane of the second magnetic body,
- first supporting means disposed so as to hold the position of the second magnetic body against the pen pressure which is transferred from the depressing member and the elastic member, and
- second supporting means for supporting the depressing member in a condition established when the rear end plane of the rear end portion forming the first magnetic body and the front end plane of the second magnetic body are placed with each other not in a parallel position by receiving the pen pressure.

Here, the second supporting means may be comprised by a peripheral portion of an opening of the casing, and at least part of the peripheral portion comprising the second supporting means contacts the depressing member.

The stylus may further comprise a support adjustment structure for adjusting the position of the second supporting means, the second supporting means being allowed to move forward and backward with the depressing member being held in a contact state, so that the rear end plane of the rear end portion forming the first magnetic body and the front end of the second magnetic body are held parallel to each other, and the initial gap between these two end planes is determined when the pen is free from its depressing force.

The depressing member may be comprised by a lock mechanism for fixing the support adjustment structure to hold a distance between the two magnetic bodies, which is defined by the supporting structure.

The depressing member may be comprised of a tapered member including the contacting member and a plate formed by the first magnetic body.

The elastic material member may be comprised of a diaphragm, which is fabricated from a film of a convex shape.

The elastic material member may be comprised of a rubber sheet.

The depressing member may be comprised of a tapered member including the contacting member and a plate forming the first magnetic body, and the second supporting means may be comprised of a suspending rod for coupling the rear plane of the pen point member and the front panel of the second magnetic body, and the suspending rod may be threaded through a penetrating hole provided in the first magnetic body and the elastic material member, and may be assembled by loading a predetermined tension thereon such that the rear end plane of the rear portion of the first magnetic body and the front end of the second magnetic body are held parallel to each other, and the initial gap between these two end planes is determined when the pen is free from its depressing force.

The suspending cord may be formed integrally with the pen tip member.

The suspending cord may be fabricated from thread.

The depressing member may be comprised of a tapered member including the contacting member and a plate forming the first magnetic body, the second supporting means comprises a suspending rod for coupling the rear plane of the pen point member and the front panel of the second magnetic body, and the suspending rod is threaded through a penetrating hole provided in the first magnetic body and the elastic material member, and may be assembled by loading a predetermined tension thereon such that the rear end plane of the rear portion of the first magnetic body and the front end of the second magnetic body are held parallel to each other, and the initial gap between these two end planes is determined when the pen is free from its depressing force.

The suspending rod may be formed integrally with the pen tip member.

The suspending rod may have a stopper mechanism, and the second magnetic body may have a ring shaped as a flat plate covering a cavity drilled in the front end of the second magnetic body and an opening of the cavity, and the suspending rod may be coupled to the second magnetic body in a condition so that the stopper mechanism is threaded through the ring of the flat plate provided in the second magnetic body.

The elastic material may be formed of ferrite rubber into which a magnetic material is dispersed.

In a fourth aspect of the present invention, the stylus comprises a cylindrical pen casing and an electrical resonant circuit, and has a pressure sensitive structure for sensing the depressing force by using a change in the inductance generated by an interval displacement between a first magnetic body and a second magnetic body having a coil wound thereabout. The stylus comprises:

- a pen tip member having a contact portion for receiving the pen pressure and a rear end plane located on a substantially opposite side of the contact portion,
- a second magnetic body having a coil wound around it which is disposed so that its front end plane is located a predetermined distance from a rear end plane of the pen tip member,
- an elastic material member, into which magnetic material is dispersed to form a first magnetic body, is disposed between the rear end plane of the pen tip member and the front end plane of the second magnetic body,
- a first supporting means is disposed to hold the position of the second magnetic body against the pen pressure that is transferred from the pen tip member and the elastic member, and
- second supporting means for supporting the pen tip member in a condition established when the rear end plane of the pen tip and the end plane of the second magnetic body are placed with each other not in a parallel position by receiving the pen pressure.

Here, the elastic material member, into which the magnetic material is dispersed, may be comprised of ferrite rubber.

In a fifth aspect of the present invention, the stylus comprises a cylindrical pen casing and an electrical resonant circuit, and has a pressure sensitive structure for sensing the depressing force by using a change in the inductance generated by interval displacement between a first magnetic body and a second magnetic body having a coil wound thereabout. The stylus comprises:

a pen tip member having a contact portion for receiving the pen pressure and a rear end plane located on a substantially opposite side of the contact member, a second magnetic body having a coil wound around it which is disposed so that its front end plane is located a predetermined distance from a rear end plane of the pen tip member, a plurality of magnetic discs, each of which is connected by elastic adhesive to provide a first magnetic body, disposed between the rear end plane of the pen tip member and the front end plane of the second magnetic body, first supporting means disposed to hold the position of the second magnetic body against the pen pressure that is transferred from the pen tip member and the plurality of magnetic discs, and supporting means for supporting the pen tip member in the condition established when the rear plane of the pen tip member and the front end plane of the second magnetic body are placed not in a parallel position by receiving the pen pressure.

In a sixth aspect of the present invention, the stylus comprises a cylindrical pen casing and an electrical resonant circuit, and has a pressure sensitive structure for sensing the depressing force by using a change in the inductance of a coil wound around a magnetic body. The stylus comprises:

a pen tip member having a contact portion for receiving the pen pressure and a rear end plane located on a substantially opposite side of the contact member, a plurality of magnetic cylinders having a coil wound around them, the cylinders being disposed so as to contact with the rear end plane of the pen tip member, and connected by elastic adhesive to each other, first supporting means disposed to hold the position of the cylinder disposed at the furthermost rear end of the cylinders against the pen pressure transferred from the pen tip member and the plurality of magnetic cylinders, and second supporting means for supporting the pen tip member in a condition established when the rear plane of the pen tip member and the end planes of the cylinders are placed with each other not in a parallel position by receiving the pen pressure.

The stylus having the pressure sensitive structure such as provided in the stylus according to the present invention senses the pen pressure using the inductance change generated in its coil wound around a magnetic body. The pressure sensitive structure of the present invention comprises the elastic member, which is interposed between the depressing member and the second magnetic body, the depressing member transferring the pressure via the rear end portion forming the first magnetic body upon receiving the pressure. The second magnetic body is supported by the first supporting means against the depressing force, and thus remained fixedly at its position.

The depressing member is thus allowed not only to make some displacement along its axial direction, but also to incline relative to the axis. If any change, such as to incline relative to this axis, takes place, the second supporting means supports the depressing member in the inclined position. The gap between the first magnetic body forming the rear end portion of the depressing member and the second magnetic body fixed at its position is changed, and that causes the inductance value of the coil wound around the second magnetic body to change.

According to the structure of the present invention as explained above, the gap between the magnetic bodies can easily and sufficiently be changed even though the inclined pressure force is applied to the pen.

Furthermore, according to the present invention, it comprises a support adjustment mechanism to make an adjustment to the position of the second supporting means so that the initial gap between the first and second magnetic bodies is defined. Thus, even a slight change from the initial gap can be sensed, and a weak pen pressure can be detected. Furthermore, it loads the elastic material portion with an initial pressure which prevents play between components of the pen.

Furthermore, according to the present invention, it comprises a lock mechanism for the support adjustment structure so that each component can be held at the respective adjusted position.

The second supporting means can be realized by using the tip of the pen casing, or by using the cord or rod to tie or couple the pen tip member and the second magnetic body.

Also, according to the present invention, the elastic material member can be eliminated by providing bonding layers formed by an elastic bond material if the moveable or fixed magnetic bodies are fabricated from a plurality of magnetic discs or cylinders. Further, the pen pressure can be sensed with high sensitivity since such a structure having a plurality of fragments coupled by an elastic material layer can move smoothly in response to the pressing force applied to the tip. Furthermore, variation of the thickness of each of the bonding layers can be averaged since a plurality of bonding layers exists.

The above and further objects and novel features of the invention will more fully appear in the following detailed description when it is read in connection with the accompanying drawings. It is to be expressly understood, however, that the drawings are for the purpose of illustration only and are not intended as a definition of the limits of the invention.

BRIEF DESCRIPTION OF THE DRAWINGS

A preferred form of the present invention is illustrated in the accompanying drawings in which.

DETAILED DESCRIPTION OF THE PREFERRED EMBODIMENT

This invention will be described in further detail by way of example with reference to the accompanying drawings.

Figure 2:
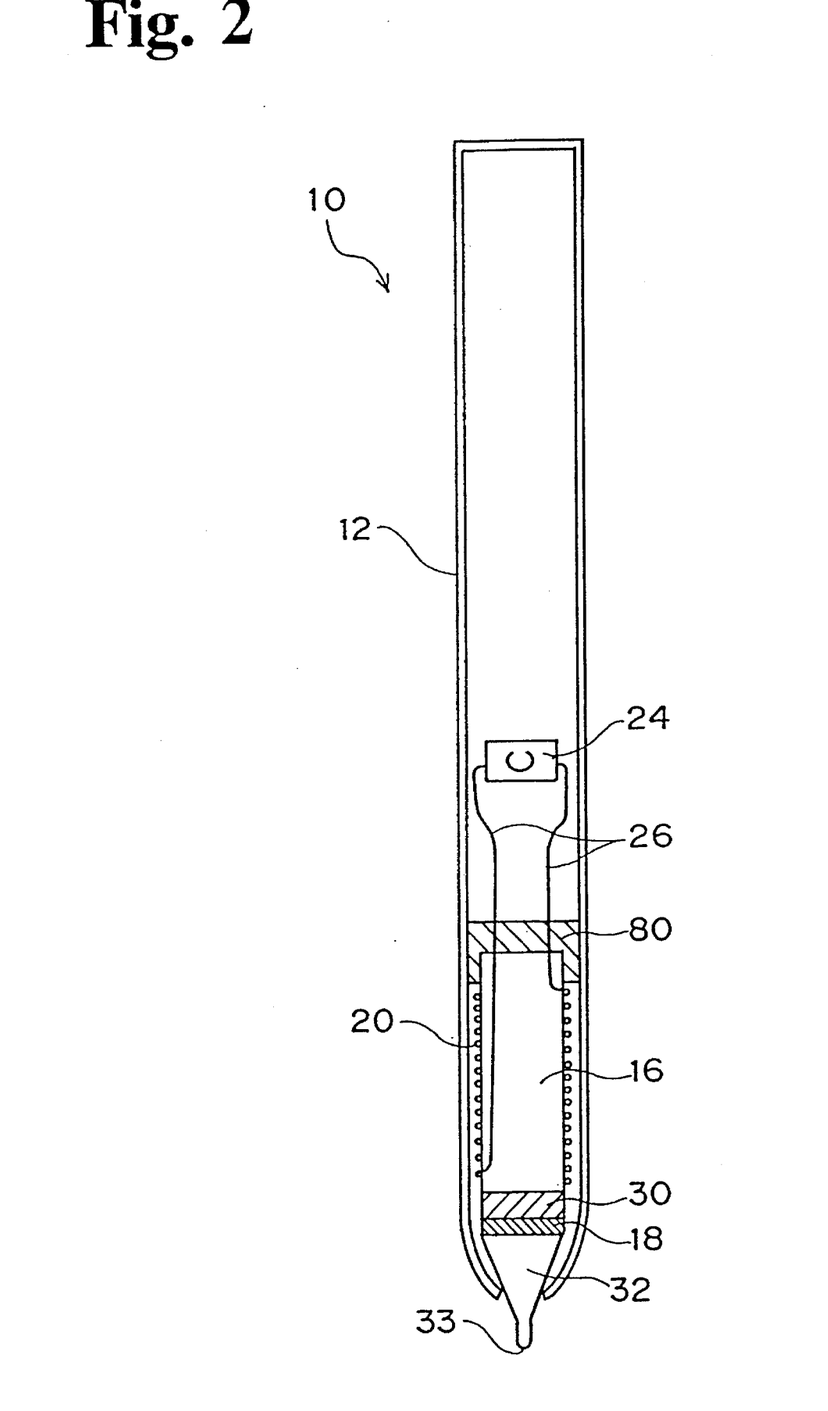
FIG. 2 is a sectional diagram of an embodiment of a stylus according to the present invention.

An embodiment of a stylus 10 according to the present invention is shown in FIG. 2. In this specification, referring to "front end" or "front side" of a member means to indicate an end of the member closer to a pen point, while "rear end" or "rear side" of a member means to indicate the other end of the member closer to the opposite end of the pen point.

The stylus 10 has a cylindrical shape of a pen casing 12 as for an outer casing, and is formed of nonmetallic material such as synthetic resin. The cylindrical shape of the pen casing 12 is designed to simulate a normal writing tool useful for human action. Therefore, the casing has a tapered shape and a hole 13 is made at the pen point to thread a core body e.t.c. The principle of the pen pressure sensing structure of the stylus 10 shown in FIG. 2 is to sense any inductance change caused by a change in the gap between ferrite core 16 (fixed magnetic body) around which coil 20 is wound and moveable magnetic body 18. Thus, application of pen pressure to the pen point causes the resonant conditions of a resonant circuit comprising the coil 20 wound around ferrite core 16 and capacitor 24 connected via wire 26 to the coil 20 to change.

To simplify, the detailed portions of the resonant circuit are eliminated in FIG. 2. For example, a stylus normally has at least one mechanical switch mounted on it to obtain switch information, and an additional coil or capacitor e.t.c. is connected to the resonant circuit to change its resonant conditions by turning on the switch. It is preferable to apply the present invention to a stylus that is of the cordless type without having any power supply, but the present invention may also be applied to a stylus with a cord or power supply. An electronic circuit for a stylus according to the present invention may be constructed with only passive components, or provided with active components in order to add additional capability.

In the embodiment shown in FIG. 2, a pen point member 32 is provided rather than the core body of the prior art in order to transfer a depressing force or pen pressure. The pen point member 32 generally has a shape similar to that of the prior art core body. That is, it is preferable that a contact portion 33 be in contact with the position detect plane at a single point. Therefore, in regard to its pen top shape, it is preferable to have a tapered shape which gradually decreases its diameter, or a cylindrical shape in which one cylinder is connected at its top to another cylinder of larger diameter, or a combination thereof. The contact portion 33 protrudes externally from an opening 13 drilled in the casing 12. The end plane at the rear side of the pen point member 32 has a flat surface transverse to the axis of the member.

Figure 3A:
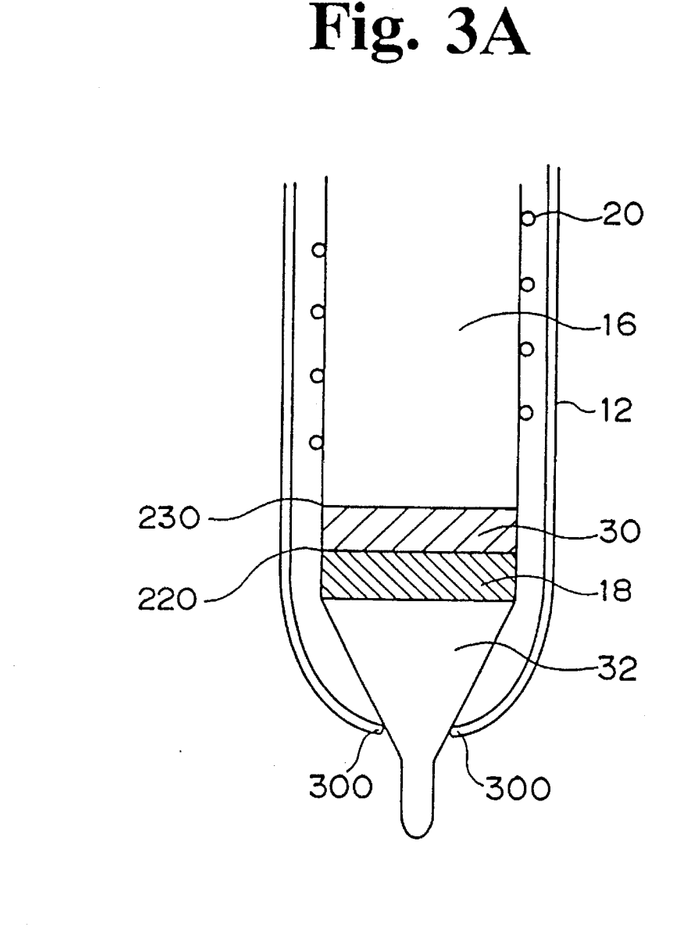
FIG. 3A and FIG. 3B are sectional views illustrating pen-down operation of the embodiment of the pen shown in FIG. 2, respectively.

In the embodiment shown in FIG. 2, a moveable magnetic body 18 is fixed to the rear end plane 220, as best shown in FIG. 3A, of the member 32, by which the member 32 and the body 18 move together. Furthermore, in the embodiment shown in FIG. 2, the body 18 is a plate having a predetermined thickness, or preferably it is a disc and the end plane of its front side has the same shape as the rear end plane 32a of the member 32. Bonding these two end planes together can be provided, for example, by applying an ordinal adhesive material between them. This integrated member is defined as a depressing member as hereinafter explained.

Furthermore, according to the present invention, an elastic material member 30 is inserted between the moveable magnetic body (the first magnetic body) 18 and the ferrite core (the second magnetic body) 16, and the first and second magnetic bodies are coupled with the member 30. According to the embodiment shown in FIG. 2, the member 30 is also a flat plate, or more preferably a disc having a predetermined thickness. Preferably, the material used for member 30 is a sheet of rubber, such as used for a cushion. Particularly, material that is easily controllable in thickness at the manufacturing stage is preferred. The front end plane of the member 30 has preferably the same shape as the rear end of the magnetic body 18. The rear end plane of the member 30 also has the same shape as the front end of the magnetic body 16. The rear end of the moveable magnetic body 18 and the front end of the member 30 (i.e. 220 in FIG. 3A) and the rear end of the member 30 and the front end of the ferrite core 16 (i.e. 230 in FIG. 3A) can be bonded together respectively using an ordinary adhesive.

The ferrite core or fixed magnetic body 16 is fixed to the pen casing 12 in conventional manner. Various means can be applied to fix the core 16, and thus an example can be considered in which the rear end of core 16 and the pen casing 12 are connected by using fixing holder 80 as shown in FIG. 2. In the present invention, the core 16 has a cylindrical shape, in which a through hole is provided since the body core does not penetrate the core.

As mentioned above, the stylus 10 of FIG. 2 has a pen point member 32. The moveable magnetic body 18, elastic material member 30, and the fixed magnetic member 16 are positioned sequentially as mentioned on the central axis of the pen casing 12, and are bonded to each other.

Figure 3B:
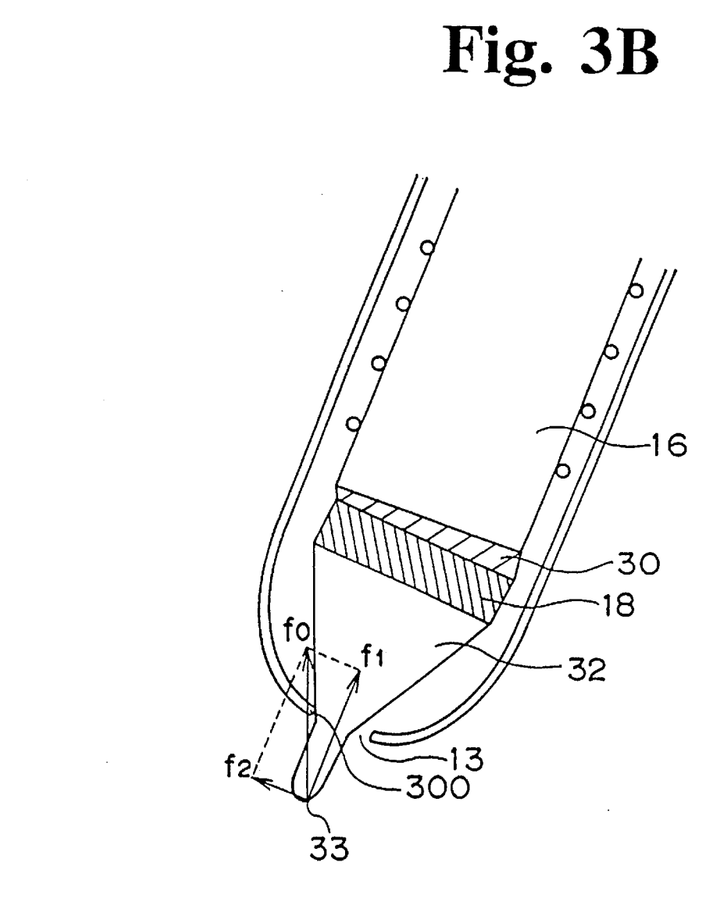

FIG. 3A and FIG. 3B are illustrations of the pen-down operation of the stylus 10 shown in FIG. 2. FIG. 3A is an enlarged sectional view of the top portion of the stylus 10 shown in FIG. 2 before the pen is put down, in other words without any depressing force being applied to the pen. In the figures, although the peripheral portion of the opening 13 in the casing 12 is shown to be in touch with the pen point member 32, some degree of gap may also be allowed. When no depressing force is being applied to the pen, the first end plane 220 between the magnetic body 18 and the member 30, and the second end plane 230 between the member 30 and the ferrite core 16 are parallel to each other, so that the member 30 has a constant thickness. The contact point 33 receives a depressing force $f_0$ from a position detecting plane. The depressing force $f_0$ can be divided into components $f_1$ and $f_2$, the former is parallel to the axis of the pen, and the latter is perpendicular to the axis. The component $f_1$ parallel to the axis is transferred to the core 16 via the magnetic body 18 and the core 16. The core 16 is fixed to the casing 12 by holder 80, and thus supported by it against the depressing force (a first supporting means). Thus a compressing force acts upon the elastic material member 30.

Furthermore, the component $f_2$, which is perpendicular to the axis of the depressing force $f_0$, is applied to the pen point 32 toward its direction so that the pen point 32 inclines along the axis of the pen 10 as shown. The inclined pen point 32 is in contact with an edge portion 300 of the opening 13 of the pen casing 12, and thus the point is supported by the peripheral portion against the depressing force $f_2$ (a second supporting means). The elastic material member 30 receives a depressing force that biases one side of the member as the pen point member 32 is inclined. This causes both ends of the elastic material member 30 to be compressed although not in parallel with each other. This means that the distance between the ferrite core 16 and the magnetic body 18 decreases so that the inductance of coil 20 wound around the core 16 changes its value.

As shown by this example, the stylus according to the present invention is arranged such that the pen point member 32, which is receiving the depressing force, moves not only in response to the force exerted parallel to the pen axis, but also to the force exerted perpendicular to the pen axis. Thus the depressing force can be changed to a more effective displacement value, i.e., to a positional change. Furthermore, since the elastic material member 30 is disposed between the moveable magnetic body 18 and the fixed magnetic body 16, the displacement of the pen point member 32 is transferred as the displacement of the member 30. In this way, the displacement between the moveable magnetic body 18 and the fixed magnetic body 16 can be changed significantly, although the pen is in an inclined position.

It should be noted that, according to the embodiment, the portion deformed by the depressing force is a member integrated by bonding together the pen point member 32 and the variable magnetic body 18. These two portions are made into a single integrated portion, and it is defined as a depressing member. It is not necessary that they be bonded with flat faces as shown in the figure. For example, irregularity can be provided on both of surfaces to be bonded respectively to help the adhesive property. The depressing member shown in FIG. 2 can be a member that has contact portion contacting with the position detecting plane at its top side, and a flat face of a magnetic body at its rear side.

The elastic material member 30 can be selected for its thickness and hardness e.t.c. in correspondence with a required pen pressure sensitivity and pen displacement features. For instance, preferably it can be a thin and flexible material, since the displacement of the pen point member is required to be small, while the detection sensitivity is required to be high. A flexible silk or nylon texture is preferred. The elastic material member 30 can also be available to get a stable pen pressure feature if it is fabricated from a rubber sheet.

Figure 4:
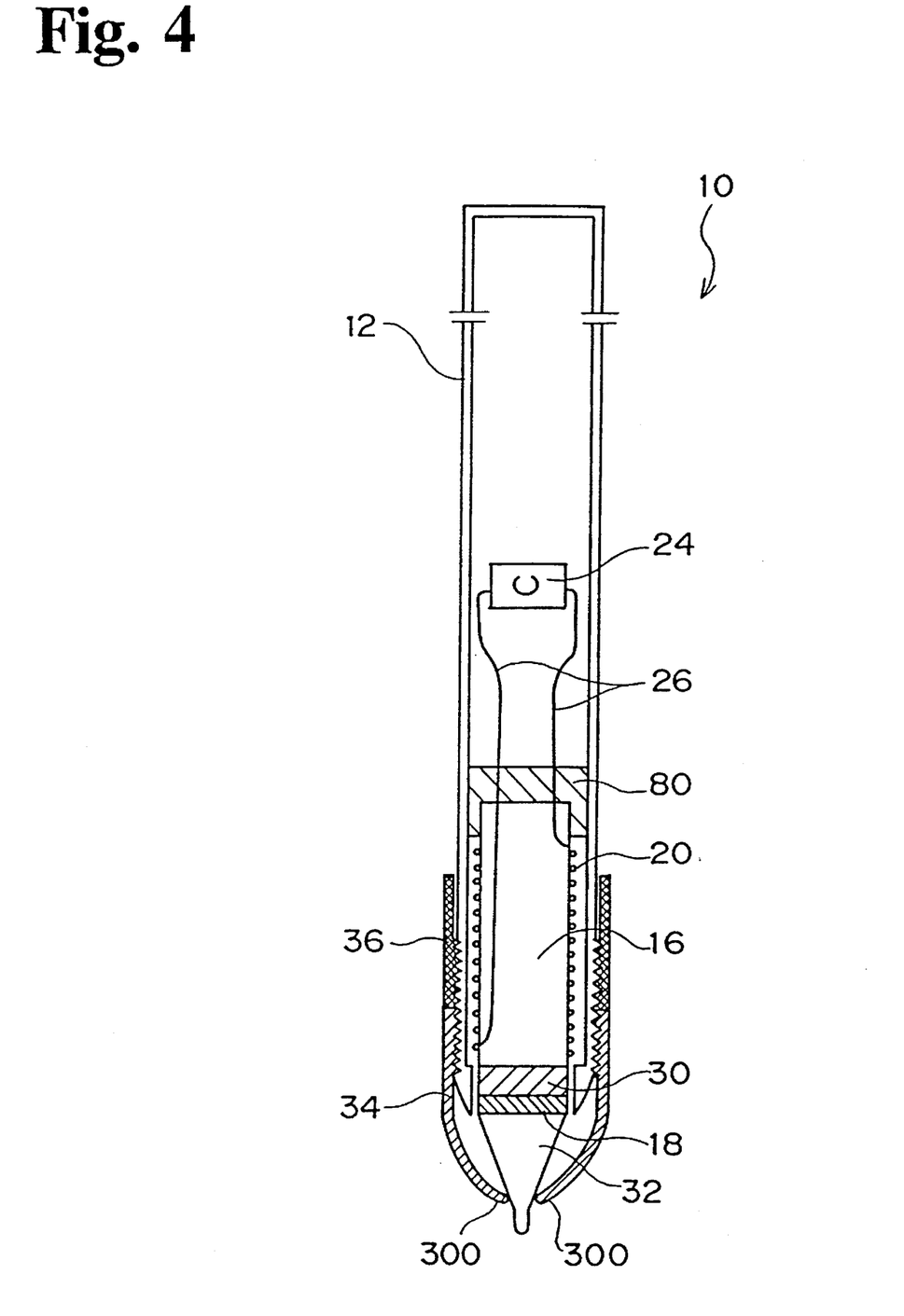
FIG. 4 is a sectional view illustrating another embodiment according to the present invention.

Another embodiment of the stylus according to the present invention is shown in FIG. 4. In the embodiment shown in FIG. 4, each of elements of the pressure sensitive structure according to the present invention is bonded using a certain adhesive, however the bonded portion may be separated if the distortion shown in FIG. 3A and FIG. 3B is repeatedly made over a long period of time, or an excessive force is loaded. Therefore, in the embodiment shown in FIG. 4, there is a support adjustment structure 34 for externally supporting the pen point member 32. The support adjustment structure 34 is arranged to fully use the edge portion 300 of the opening of the casing 12 of FIGS. 3A and 3B as a supporting means of the pen point member 32. The structure 34 has a configuration that forms the edge portion 300 before and behind the pen axis.

The support adjustment structure 34 comprises a cylinder portion threaded on its inner wall, and a tapered portion having the opening at the top and an edge portion 300 of the opening. The structure 34 has a thread groove on the cylindrical portion of its internal wall threaded with a corresponding screw provided on the outer shell of the casing 12. Rotating the screw moves forward or backward the edge portion 300 of the pen point. The opening diameter at the pen point of structure 34 is selected to be smaller than the maximum diameter of the pen point portion 32.

As the structure moves backward, the pen point portion 32 comes to be pushed backward by the edge portion 300 of the opening 13 of the support adjustment structure 34. That is the condition with which the pen tip member 32 is held with a predetermined initial pressure. In this way, the predetermined pressure is applied to the member 32 so that no gap is produced between the elements, i.e., no looseness exists between them. If there is any looseness, then a very small pen pressure cannot be detected.

The initial pressure is the pressure applied to the elastic body during the no pen pressure state. Ideally the initial pressure is set substantially to zero in order to make the initial pressure as high as possible. It is preferable to provide a lock mechanism 36 for locking the position of the support adjustment structure 34 after the initial pressure adjustment has been completed. The lock mechanism 36 has a cylinder threaded into a screw slot on the outer wall of the pen casing the same as that of the adjustment structure 34. The lock mechanism 36 is also positioned behind the adjustment structure 34. In locking, first the position of the adjustment structure 34 is determined, then the lock mechanism 36 is advanced by turning itself until its front end touches the rear end of the adjustment structure 34 so that the position of the adjustment mechanism 36 is locked or held.

Figure 5:
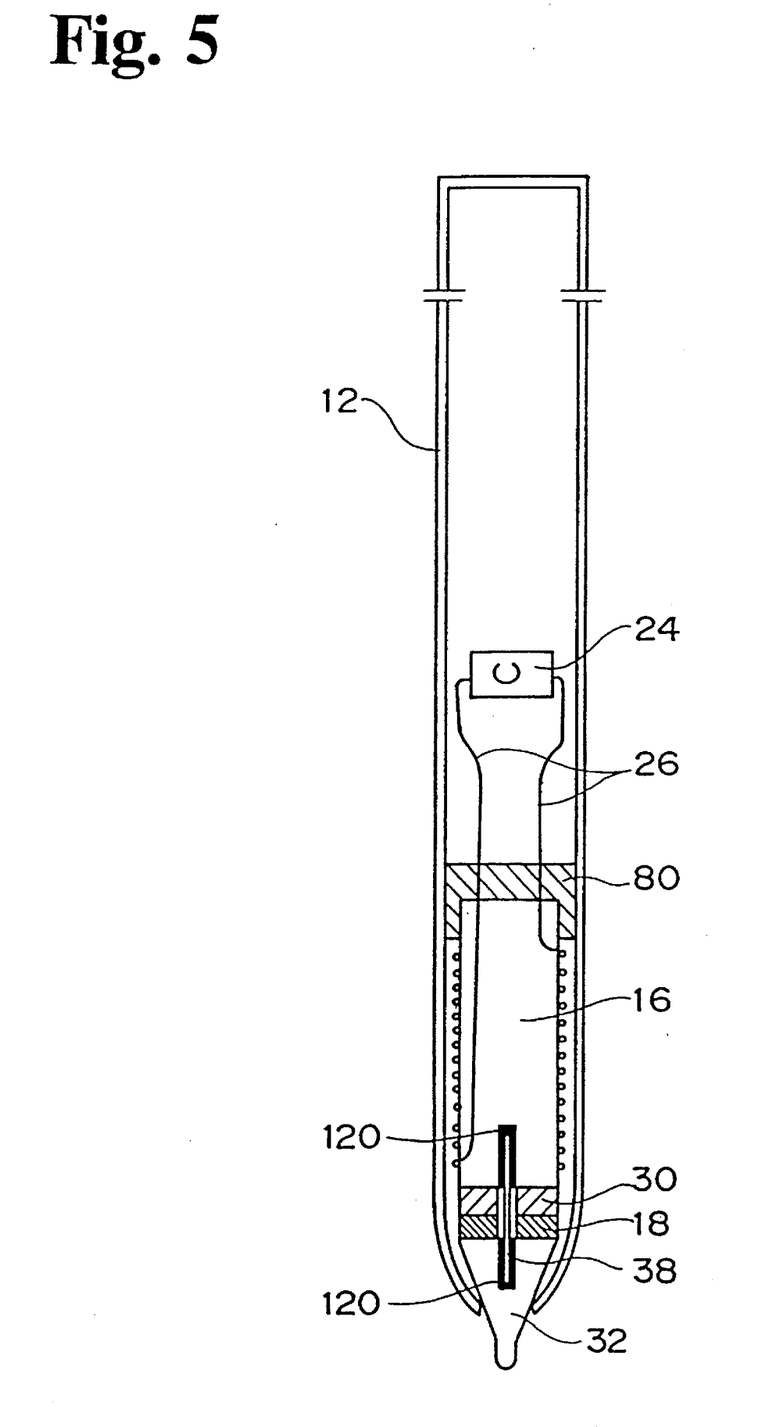
FIG. 5 is a sectional view of components of a pressure sensitive structure for holding components without play showing another embodiment of the present invention.

Further, another embodiment for holding the components of the pressure sensitive structure according to the present invention is shown in FIG. 5. In FIG. 5, a flexible cord 38 extends between the pen point member 32 and the ferrite core 16. One end of suspend cord 38 is fixed to the center of the front end of the ferrite core 6. The suspend cord 38 is thus positioned on the center axis of the pressure sensitive structure. In assembling the structure, the length of the cord 38 is such that the cord is loaded with a suitable tension. The pen top member 32 and the ferrite core 16, and the magnetic body 18 and the elastic member 30 lying between them are held with a suitable initial gap and initial pressure, and these end planes are held in parallel with each other. According to this embodiment, the elements can hold their positions without looseness although their manufacturing accuracy, such as in thickness is not sufficiently high, since the center axis of the assembled pressure sensitive structure is fixed.

More specifically, as shown, holes for threading the suspend cord 38 are made into the pen point member 32 and the ferrite core 16 respectively, and then the holes threaded with cord 38 are filled with an adhesive to fix them together. In both the magnetic body 18 and the elastic member 30 lying between the pen top member 32 and the ferrite core 16, a center hole through which the suspend cord 38 can be threaded and be slidable is provided respectively, when the holding method is carried out as shown in FIG. 5.

Preferably, the suspend cord 38 may have a flexible characteristic and certain degree of elasticity. Another fabricating method for the cord 38 is that synthetic resin may be used to mold the cord and the pen point member integrally, and to form a pen tip member with a suspend cord, and to bond only one end to the ferrite core 16.

It should be noted in the embodiment shown in FIG. 5 that when the suspend cord 38 is loaded with pen pressure, i.e., a force that is to compress the suspend cord 38 is applied to it, the suspend cord 38 does not resist. That is, it is important that the suspend cord 38 easily flex itself in response to the applied pen pressure. If the suspend cord 38 itself effects reaction while the pen pressure is being applied, the pen pressure is not sufficiently transferred to the elastic material member 30 and thereby the decrease of sensitivity of the pen is decreased. If a directionally inclined pen pressure is applied, then the opposite side of the magnetic body 18 (the proximity side to the positional detection plane as shown in FIG. 3) is moved away from the magnetic body 16, which decreases the average compression deformation of the elastic material member so that the displacement between the magnetic bodies is decreased.

Therefore, the suspend cord 38 may be a high strength plastic product such as fishing line. This line is strong, thin and flexible, and has a certain degree of elasticity that eases assembly.

Figure 6:
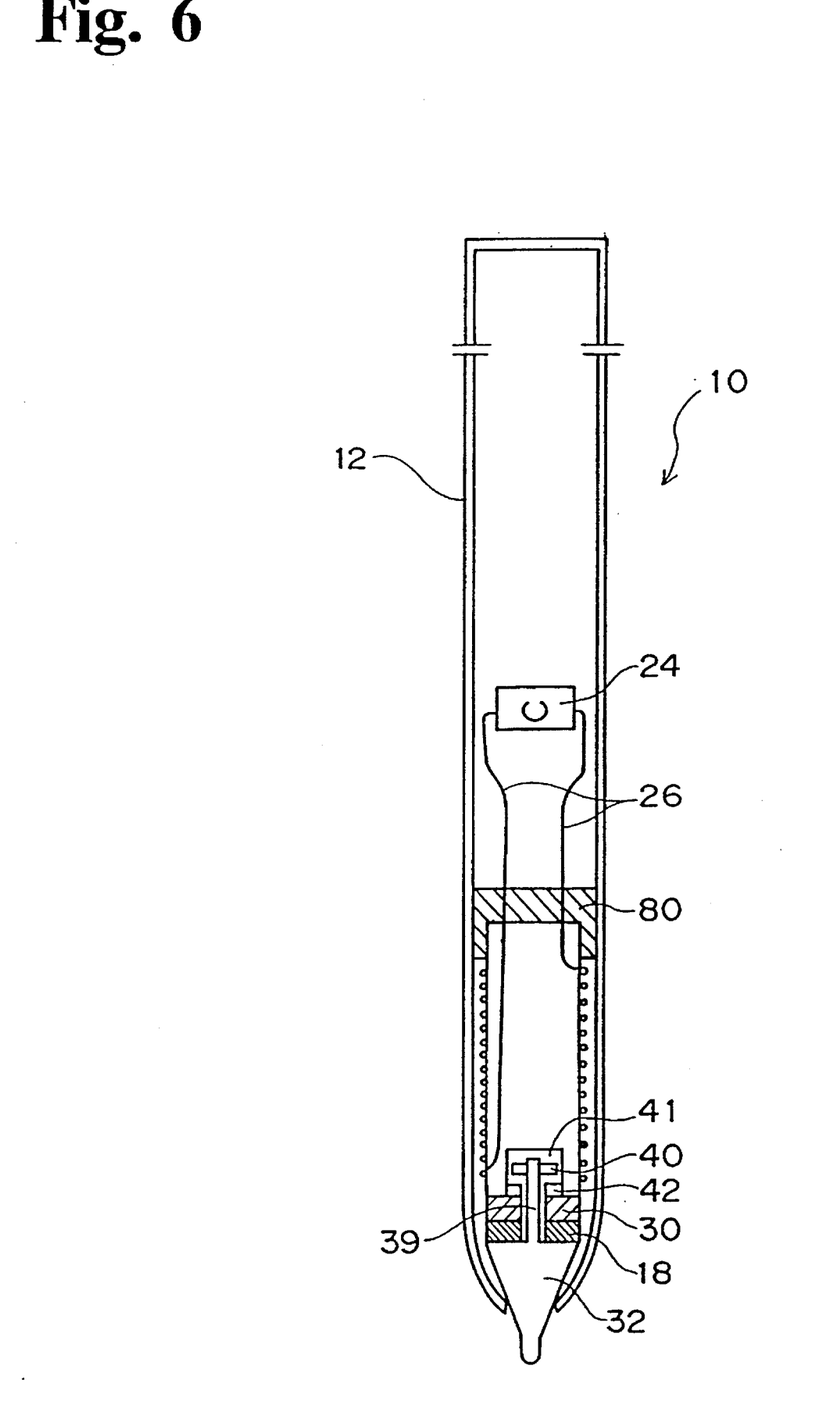
FIG. 6 is a sectional view similar to that of FIG. 5 illustrating another example of the present invention.

Another embodiment employing a holding method is shown in FIG. 6, which is similar to FIG. 5. According to the embodiment shown in FIG. 6, a suspend rod 39 is used instead of a suspend cord. One end of the suspend rod 39 is fixed to the rear end plane center of the pen point member 32. These portions can be bonded together, or integrated with the pen point member 32. The other end of the suspend rod 39 provides a stopper mechanism 40. The front end of the ferrite core 16 has a cavity 41 as shown, and to its opening a ring shaped plate, a so called "washer" 42, is fixed, which has a hold slightly larger than that of the suspend rod 39. A center hole, through which the suspend rod 39 extends, is drilled in the magnetic body 16 and the elastic material member 30.

In assembling the FIG. 6 embodiment, the suspend rod 39 fixed to the pen point member 32 is threaded through by the magnetic body 18 and the elastic material member 18, and then the tip of the suspend rod 39 is threaded through the washer 42 such that the stopper mechanism 40 is positioned within the cavity 41 of the ferrite core 18. The stopper mechanism 40 is a general purpose mechanism through which a protruded portion can enter or exit by a spring device for example. When the protruded portion of the stopper mechanism 40 passes through each hole of the components, the protruded portion is housed in the suspend rod 39 so that it can be smoothly passed by. Once it passes, the protruded portion achieves a protruded state, so that the suspend rod 39 cannot pass through the ferrite core 16, even if one tried to extract the suspend rod 39 in the reverse direction. Considering this assembled initial condition, the length of the suspend rod 39 and the position of the stopper mechanism are designed to load the rod 39 with suitable tension. Thus, when no pen pressure is applied to the pen, the pen point member 32 and the ferrite core 16, and the magnetic body 18 and the elastic material member 30 lying between them are held with a suitable initial gap and pressure, and the end planes are held parallel to each other.

When pen pressure is applied to the embodiment shown in FIG. 6, the suspend rod 39 can move either parallel to the axial direction of the pen casing 12 or in an inclined direction from its axis. The suspending rod 39 can move toward the axial direction since the cavity 41 of the ferrite core 18 has sufficient depth. The rod 39 also can move toward an inclined direction since the hole diameter of the washer 42 is larger than that of the suspend rod 39. In this way, satisfactory detection of the pen pressure can be attained, although the stylus according to the arrangement shown in FIG. 6 is inclined.

Figure 7:
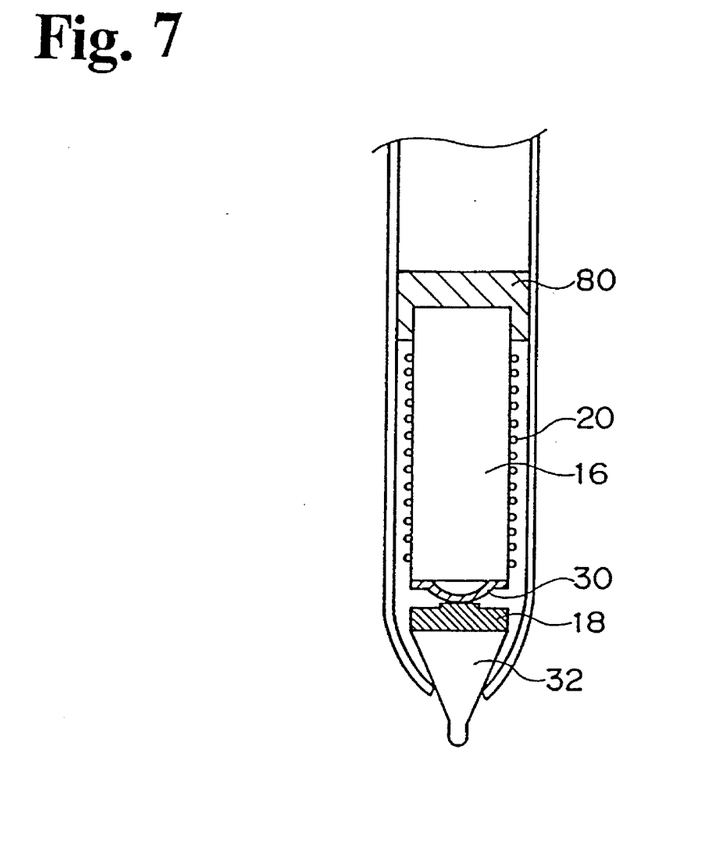
FIG. 7 is a partial sectional view of a stylus illustrating another embodiment of the present invention.

Next, a partial sectional diagram of a stylus of another example according to the present invention is shown in FIG. 7. In FIG. 7, a diaphragm is used and which is fabricated into convex form using a film such as a rubber sheet instead of a flat disc type sheet as is the elastic material member 30 shown in FIG. 2 or 4. The structural feature of this diaphragm is that, when the pen pressure is applied to the pen, the retracting distance of the pen tip member is lengthened since the convex portion is provided. This means that the pen seems to have a long stroke for its user. An additional feature of this structure is that the convex portion is collapsed, and thus the pen tip member is retracted only when more than a predetermined pen pressure is loaded to it. This means that the pen gives its user a click reaction. In this manner, several pen pressure feelings can be provided by deforming the elastic material member, which gives its user an agreeable operability.

Figure 8A:
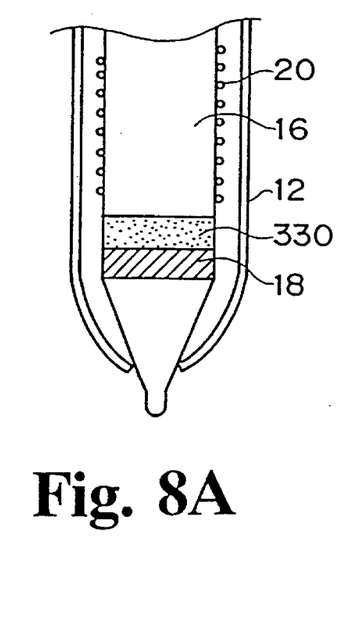
FIG. 8A and FIG. 8B are partial sectional views of a stylus illustrating still another embodiment of the present invention, respectively.
Figure 8B:
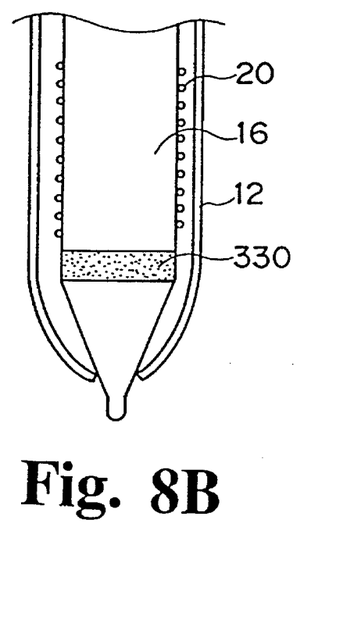

A partial sectional diagram of a stylus of a further example according to the present invention is shown in FIG. 8A and FIG. 8B. The example shown in FIG. 8A has a ferrite rubber 330 used as an elastic material member into which magnetic material is dispersed. In this arrangement, deformation of the ferrite rubber 330 changes the inductance, and it can further increase pen pressure sensitivity. According to the embodiment shown in FIG. 8B, the sensitivity may by decreased because of the inductance change produced only by the ferrite rubber 330, its required cost may however be decreased because of the elimination of the movable magnetic body.

Figures 9A, 9B:
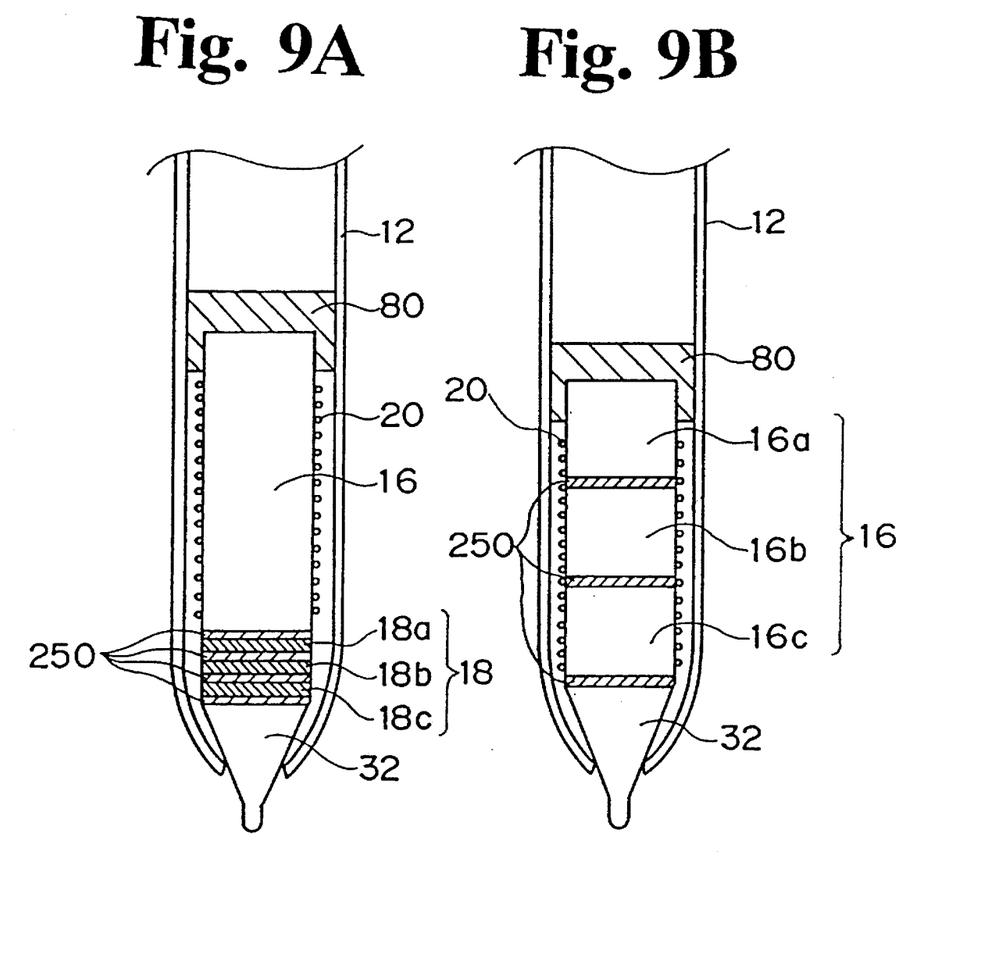
FIG. 9A and FIG. 9B are partial sectional diagrams of a stylus illustrating still another embodiment of the present invention, respectively.

A partial sectional diagram of a stylus of a further example according to the present invention is shown in FIG. 9A and FIG. 9B. The examples shown in FIGS. 9A and 9B have an arrangement using both an elastic property and an adhesive property by replacing the elastic material member with an adhesive of elastic property. In FIG. 9A, the moveable magnetic body 18 comprises a plurality of magnetic discs 18a, 18b and 18c and between their end planes they are connected using elastic adhesive 250. Elastic adhesive material and other adhesive material can be used for bonding between the magnetic disc 18c and the pen tip member 32; and the magnetic disc 18a and the ferrite core 16. In this way, the moveable magnetic body 18 is a laminated material body whereby a plurality of bonding layers 250 is provided, each of which uses elastic adhesive material, and variations in thickness of the bonding layers and in mechanical property are decreased. This is particularly beneficial in mass production of the pen. Also, by providing a plurality of elastic connecting members, the operability of the tip of the pen can be increased, and allowed to respond sensitively to delicate pen pressure. Separation becomes difficult since the distortion imposed upon the bonding portion is dispersed. The number of the magnetic discs is of course not limited to three as shown, but may be suitably selected.

In the embodiment shown in FIG. 9B, a separate moveable magnetic body is not provided for the ferrite core 16, but alternatively it comprises a plurality of magnetic cylinders 16a, 16b and 16c, and each of the magnetic cylinders is connected with each other by using elastic adhesive 250. The top side of the magnetic cylinder 16c is connected to the pen tip member 32 by elastic adhesive 250, and the rear side end of the magnetic cylinder 16a if fixed to the pen casing 12 by using the fixing holder 80. Further, the coil 20 is wound over the divided ferrite cores. In this arrangement, when pressure is applied to the pen, each of bonding layers 250 fabricated by elastic adhesive is compressed or distorted to change the gaps between the magnetic cylinders. The inductance of the coil changes and thus the pen pressure may be detected. This case also averages the variation in thickness of the bonding layers 250, and decreases the variation in the property. The number of the magnetic cylinders is not limited to three shown, and may be suitably selected.

The present invention comprises a pressure sensitive structure using the change in the gap between the fixed magnetic body and the variable magnetic body, said change being caused by the depressing force, wherein an elastic material member lying between the end plates facing of the fixed magnetic body and the moveable magnetic body, the moveable magnetic body can be displaced with sufficient degree even though the depressing force is applied along an inclined axis. Thereby, the present invention can realize a pressure sensitive structure that detects the depressing force without being influenced by its direction.

Also, the stylus comprising the pressure sensitive structure according to the present invention achieves a light touch operation without a need to effect excessive force specifically, although the slanted pen-down operation is performed. Furthermore, the pressure sensitive structure according to the present invention can be provided at low cost since it has a simplified structure.

Also, the stylus having the pressure sensitive structure according to the present invention can easily realize the most suitable pen pressure and pressure displacement characteristics, since several materials can be selected as an elastic material in regard to thickness and hardness.

The stylus having the pressure sensitive structure according to the present invention comprises a support adjustment structure, which can control the initial gap and initial pressure between the fixed magnetic body and the variable magnetic body with fine adjustment to a respective predetermined value so that is can guarantee a stable operation during its use by performing fine adjustment to eliminate looseness before its usage. Furthermore, the stylus according to the present invention can detect a delicate pen touch such as when the pen tip slightly touches the detecting plane.

The stylus having the pressure sensitive structure according to the present invention can assemble the pen tip member and the fixed magnetic body with minimum looseness at the pen tip member, by coupling a suspend cord or rod along its center axis, although their manufacturing accuracy such as in thickness is not sufficiently high. Then, the stylus according to the present invention can also detect a delicate pen touch.

In the arrangement wherein the magnetic body comprises a plurality of assembled components, each connected using an elastic adhesive. Thus the elastic material member can be eliminated, and the variation in thickness is averaged since there is a plurality of bonding layers, and thus a property-stabilized-stylus can be provided.

Although the present invention has been described in its preferred form, it is understood that the present disclosure of the preferred form has been changed in the details of construction and the combination and arrangement of parts may be resorted to without departing from the spirit and the scope of the invention as hereinafter claimed.

What is claimed is:

1. A pressure sensitive stylus for sensing a depressing force by using a change in inductance generated by an interval displacement due to the depressing force between a first magnetic body and a second magnetic body having a coil wound thereabout, the stylus comprising:

a depressing member having a contact portion for receiving the depressing force and a rear end portion located substantially opposite to said contact portion, at least said rear end portion of said depressing member forming a first magnetic body, a second magnetic body having a coil wound thereabout which is disposed so that its front end plane is located a predetermined distance from the rear end plane of said depressing member, an elastic material member disposed between said rear end plane of said depressing member and said front end plane of said second magnetic body, first supporting means for holding the position of said second magnetic body against the depressing force which is transferred through said depressing member and said elastic member, and second supporting means for holding the position of said depressing member when the rear end plane of said depressing member and the front end plane of said second magnetic body are placed by the depressing force in a position other than parallel.

2. The pressure sensitive stylus as claimed in claim 1, further comprising a support adjustment structure for adjusting the position of said second supporting means, said second supporting means being allowed to move forward and backward with said depressing member being held in contact state, so that the rear end plane of said rear end portion forming said first magnetic body and the front end plane of said second magnetic body are held parallel to each other, and determines the initial gap between these two end planes when the stylus is free from its depressing force.

3. The pressure sensitive stylus as claimed in claim 1, wherein said depressing member comprises a tapered member including said contact portion, and a flat plate formed by said first magnetic body.

4. A pressure sensitive stylus for sensing the depressing force by using a change in the inductance generated by an interval displacement between a first magnetic body and a second magnetic body having a coil wound thereabout in a stylus that comprises a cylindrical pen casing and an electrical resonant circuit, said stylus comprising:

a depressing member having a contact portion for receiving pressure applied to said stylus and a rear end portion located substantially opposite said contact portion, said rear end portion forming a first magnetic body, a second magnetic body having a coil wound thereabout which is disposed so that its front end plane is located a predetermined distance from a rear end plane of said rear end portion forming said first magnetic body, an elastic material member disposed between said rear end portion formed by said first magnetic body and the front end plane of said second magnetic body, first supporting means for holding the position of said second magnetic body against the pressure applied to said stylus from said depressing member and said elastic member, and second supporting means for supporting said depressing member in a condition established when said rear end portion forming said first magnetic body and the end plane of said second magnetic body are placed by the pressure in a position other than parallel.

5. The pressure sensitive stylus as claimed in claim 4, further comprising a support adjustment arrangement for adjusting the position of said second supporting means, said second supporting means movable forward and backward with said depressing member when held in a contact state, so that the rear en plane of said rear end portion forming said first magnetic body and said front end of said second magnetic body are held parallel to each other, and determines the initial gap between these two end planes when the stylus is free from its depressing force.

6. The pressure sensitive stylus as claimed in claim 4, wherein said depressing member comprises a tapered member including said contacting portion and a plate formed by said first magnetic body.

7. A stylus comprising a cylindrical pen casing and an electrical resonant circuit, and having a pressure sensitive structure for sensing the depressing force by using a change in the inductance generated by an interval displacement between a first magnetic body and a second magnetic body having a coil wound thereabout, wherein said stylus comprises:

a depressing member having a contact portion for receiving the pressure applied to said stylus and a rear end portion located on the substantially opposite side of said contact portion, said rear end portion forming a first magnetic body, a second magnetic body having a coil wound thereabout which is disposed so that its front end plane is located a predetermined distance from a rear end plane of said rear end portion forming said first magnetic body, an elastic material member disposed between said rear end portion forming said first magnetic body and the front end plane of said second magnetic body, first supporting means disposed for holding the position of said second magnetic body against the pressure which is transferred from said depressing member and said elastic member, and second supporting means for supporting said depressing member in a condition established when the rear end plane of said rear end portion forming said first magnetic body and the front end plane of said second magnetic body are placed in a position other than parallel by receiving the pen pressure.

8. The stylus as claimed in claim 7, wherein said second supporting means comprises a peripheral portion of an opening of said casing, at least part of said peripheral portion comprising said second supporting means by contacting said depressing member.

9. The stylus as claimed in claim 7, further comprising a support adjustment structure for adjusting the position of said second supporting means, said second supporting means movable forward and backward with said depressing member when held in a contact state, so that the rear end plane of said rear end portion forming said first magnetic and said front end of said second magnetic body are held parallel to each other, and determines the initial gap between these two end planes when the stylus is free from its depressing force.

10. The stylus as claimed in claim 7, wherein said depressing member comprises a lock mechanism for fixing said support adjustment structure to hold a distance between said two magnetic bodies, which is defined by said supporting structure.

11. The stylus as claimed in claim 7, wherein said depressing member comprises a tapered member including said contact portion and a plate formed by said first magnetic body.

12. The stylus as claimed in claim 7, wherein said elastic material member comprises a diaphragm fabricated from a film of a convex shape.

13. The stylus as claimed in claim 7, wherein said elastic material member comprises a rubber sheet.

14. The stylus as claimed in claim 7, wherein said depressing member comprises a tapered member including said contact portion and a plate forming said first magnetic body, said second supporting means comprises a suspending rod for coupling the rear plane of said depressing member and said front portion of said second magnetic body, and said suspending rod is threaded through a penetrating hole provided in said first magnetic body and said elastic material member, and assembled by loading a predetermined tension thereon such that the rear end plane of said rear portion of said first magnetic body and said front end portion of said second magnetic body are held in parallel to each other, and determines the initial gap between these two end planes when the stylus is free from its depressing force.

15. The stylus as claimed in claim 14, wherein said suspending cord is formed integrally with said depressing member.

16. The stylus as claimed in claim 14, wherein said suspending cord is fabricated from thread.

17. The stylus as claimed in claim 7, wherein said depressing member comprises a tapered member including said contact portion and a plate forming said first magnetic body, said second supporting means comprises a suspending rod for coupling the rear plane of said depressing member and said front portion of said second magnetic body, and said suspending rod is threaded through a penetrating hole provided in said first magnetic body and said elastic material member, and is assembled by loading a predetermined tension thereon such that the rear end plane of said rear portion of said first magnetic body and said front end portion of said second magnetic body are held parallel to each other, and determines the initial gap between these two end planes when the stylus is free from its depressing force.

18. The stylus as claimed in claim 17, wherein said suspending rod is formed integrally with said depressing member.

19. The stylus as claimed in claim 18, wherein said suspending rod has a stopper mechanism, and said second magnetic body has a ring shaped flat plate covering a cavity drilled in the front end of said second magnetic body, and said suspending rod is coupled to said second magnetic body in a condition in which said stopper mechanism is threaded through said ring of said flat plate provided in said second magnetic body.

20. The stylus as claimed in claim 17, wherein said elastic material member is formed of ferrite rubber into which a magnetic material is dispersed.

21. A stylus comprising a cylindrical pen casing and an electrical resonant circuit, and having a pressure sensitive structure for sensing the depressing force by using a change in the inductance generated by an interval displacement between a first magnetic body and a second magnetic body having a coil wound thereabout, wherein said stylus comprises:

a pen tip member having a contact portion for receiving the pressure applied to said stylus and a rear end plane located on the substantially opposite side of said contact portion, a second magnetic body having a coil wound thereabout which is disposed so that its front end plane is located a predetermined distance from a rear end plane of said pen tip member, an elastic material member into which magnetic material is dispersed to form a first magnetic body, said elastic material member disposed between said rear end plane of said pen tip member and said front end plane of said second magnetic body, first supporting means for holding the position of said second magnetic body against the pressure that is transferred from said pen tip member and said elastic member, and second supporting means for supporting said pen tip member in a condition established when said rear end plane of said pen tip member and said front end plane of said second magnetic body are placed in a position other than parallel by receiving the pen pressure.

22. The stylus as claimed in claim 21, wherein said elastic material member into which said magnetic material is dispersed comprises ferrite rubber.

23. A stylus comprising a cylindrical pen casing and an electrical resonant circuit, and having a pressure sensitive structure for sensing the depressing force by using a change in the inductance generated by an interval displacement between a first magnetic body and a second magnetic body having a coil wound thereabout, wherein said stylus comprises:

a pen tip member having a contact portion for receiving the pressure applied to said stylus and a rear end plane located substantially opposite to said contact member, a second magnetic body having a coil wound thereabout which is disposed so that its front end plane is located a predetermined distance from a rear end plane of said pen tip member, a plurality of magnetic discs, each of which is connected by an elastic adhesive to form a first magnetic body, disposed between said rear end plane of said pen tip member and said front end plane of said second magnetic body, first supporting means for holding the position of said second magnetic body against the pressure that is transferred from said pen tip member and said plurality of said magnetic discs, and second supporting means for supporting said pen tip member in a condition established when said rear plane of said pen tip member and said front end plane of said second magnetic body are placed in a position other than parallel by receiving the pressure.

24. A stylus comprising a cylindrical pen casing and an electrical resonant circuit, and having a pressure sensitive structure for sensing the depressing force by using a change in the inductance of a coil wound around a magnetic body, wherein said stylus comprises:

a pen tip member having a contact portion for receiving pressure applied to said stylus and a rear end plane located substantially opposite to said contact member, a plurality of magnetic cylinders having a coil wound thereabout, said cylinders disposed to contact the rear end plane of said pen tip member, and connected by elastic adhesive to each other, first supporting means for holding the position of the cylinder disposed at the rear end of said cylinders against the pen pressure transferred from said pen tip member and said plurality of said magnetic cylinders, and second supporting means for supporting said pen tip member in a condition established when said rear plane of said pen tip member and said end planes of said cylinders are placed in a position other than parallel by receiving the pressure.

* * * * *